United States Patent Office 3,795,641
Patented Mar. 5, 1974

3,795,641
STORAGE-STABLE OXYGENATED POLYFUNC-
TIONAL ACRYLIC ESTER COMPOSITIONS
FOR ANAEROBIC SEALANTS
William Arthur Lees, Chandlers Ford, David John Bennett, Portsmouth, John Richard Swire, Fair Oak, and Peter Harding, Southampton, England, assignors to The Borden Chemical Company (U.K.) Ltd., North Baddesley, Southampton, England
No Drawing. Filed Sept. 21, 1972, Ser. No. 290,818
Claims priority, application Great Britain, Sept. 27, 1971, 44,983/71
Int. Cl. C08f 3/64, 3/66
U.S. Cl. 260—89.5 R         8 Claims

ABSTRACT OF THE DISCLOSURE

Oxygenation of polyfunctional acrylate monomers, typified by triethylene glycol dimethacrylate, in the presence of minor amounts of an organic tertiary amine and/or an imido compound and in the presence of a conventional amount of polymerization inhibitor yields storage-stable compositions useful as adhesive sealants curing anaerobically. In a preferred procedure, oxygenation is carried out successively in the presence of o-benzoic sulfimide and then in the presence also of N-N-dimethyl-p-toluidine.

BACKGROUND OF THE INVENTION

This invention relates to adhesive sealants having the ability to polymerize rapidly on exclusion of air but stable in the presence of air for extended periods at normal temperatures. In particular, it relates to such sealants derived from reactive compositions containing as major component a substance having a plurality of ethylenically unsaturated polymerizable groups, the prototypes of such substances being polyacrylates or polymethacrylates of polyethylene glycols such as triethyleneglycol or tetraethyleneglycol. (As used elsewhere herein, the term "polyacrylates" is to be understood as including "polymethacrylates.")

In U.S. 2,628,178 issued Feb. 10, 1953, it is disclosed that polyacrylate monomers of the stated type can be treated to render them capable of polymerizing under anaerobic conditions by passing air or oxygen through the monomer until a specified degree of oxygenation has been achieved. The monomer treated in this way, however, must be maintained in contact with a current of air or oxygen during storage in order to prevent autogenous polymerization. Thus, the oxygenated derivatives of polyethyleneglycol polyacrylate monomers are not only capable of polymerizing anaerobically but are also unstable unless a continuous contact with fresh oxygen is maintained. This known process, therefore, has the disadvantage that it is totally unsuited to the preparation and distribution of small quantities of adhesive sealants, since it is clearly impracticable to maintain a constant supply of air or oxygen to a large number of small containers over an extended period of commercial conditions.

It is, therefore, common practice to manufacture anaerobic curing adhesive sealant compositions by employing unoxygenated monomer and inducing the anaerobic curing properties by employing a variety of catalytic substances. Thus, in U.S. Pat. 2,895,950 there is disclosed an anaerobic curing composition utilizing unoxygenated monomers of the above described type in conjunction with certain organic hydroperoxide catalysts. Such compositions have satisfactory shelf stability as long as some air is present. This need be no more than the air content of the ullage in the container, preferably combined with the use of a container which is permeable to air, for example, a polyethylene bottle. Under these conditions a shelf life of one year or more can be obtained.

Anaerobic curing compositions having similar properties are disclosed in U.S. Pat. 3,041,322 wherein an unoxygenated monomer is used together with a tertiary butyl hydroperoxide and organic tertiary amine.

Still another sealant system using unoxygenated monomers is disclosed in U.S. Pat. 3,203,941 wherein a catalyst is selected from hydrogen peroxide and organic hydroperoxides together with a specified polyamino compound as accelerator.

We have confirmed by experiment that the unoxygenated monomers used in the above disclosures cannot be satisfactorily replaced by oxygenated monomers. When a monomer has been rendered unstable by passing it through a stream of air or oxygen, it cannot be subsequently stabilized by the addition of a hydroperoxide or an amine either alone or in combination. Using monomer containing a hydroquinone inhibitor in amount corresponding to about 100 parts per million, we have found that a sample of tetraethylene glycol dimethacrylate which had been subjected to oxygenation by passing through it a stream of air, gelled within a few hours after interruption of the air stream and that further samples to which cumene hydroperoxide, dimethyl paratoluidine and a mixture of cumene hydroperoxide and dimethylparatoluidine were separately added, also gelled within a few hours even when stored in the presence of air.

SUMMARY OF THE INVENTION

Wholly unexpected in the light of the teachings of the foregoing publications and our aforementioned experiments is our discovery that storage-stable compositions having particular utility as anaerobic curing adhesive sealants can be prepared by effecting oxygenation of a polyacrylate monomer of the above described type in the presence of a nitrogen compound selected singly or in combination from the group consisting of tertiary amines and compounds containing an imido group having the formulation

and in the presence of an effective amount of a conventional inhibitor such as is present in commercial acrylic monomers.

As distinct from the results obtained in accordance with the teachings of U.S. Pat. 2,628,178, the monomer which has been oxygenated in the presence of such a nitrogen compound will remain stable in the presence of air for a year or more without the necessity of maintaining a continuous air or oxygen stream through the monomer. Furthermore, the mixture of monomer and nitrogen compound, oxygenated in accordance with the present invention exhibits excellent anaerobic curing properties, that is to say that polymerization will ensue within a short time when air is excluded, as, for example, when the oxidized monomer is placed between close-fitting surfaces.

Experiments have also shown that satisfactory storage-stability of such oxygenated monomer/amine or monomer/imide compositions can be obtained only when a conventional polymerization inhibitor is also present in the amount of about 10–200 parts per million, based on weight of monomer.

Accordingly, the present invention comprises a method for preparing a storage-stable adhesive capable of curing in the absence of air, which method comprises (i) mixing (a) a monomer corresponding to the general formula

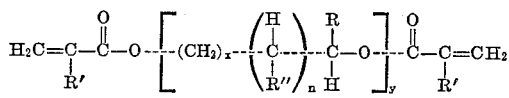

(wherein R is —H, —CH$_3$, —C$_2$H$_5$, —CH$_2$OH or —CH$_2$OCOCR′=CH$_2$, R′ is —H, —Cl, —CH$_3$ or —C$_2$H$_5$, R″ is —H, —OH, or —OCOCR′=CH$_2$ $x$ and $y$ are integers each equal to at least 1 and $n$ is 0 or 1), and containing (b) an effective amount of an inhibitor for olefinic polymerization, with (c) a minor proportion of a nitrogen compound selected singly or in combination from the group consisting of organic tertiary amines and imido compounds having the group

and (ii) passing a stream of oxygen-bearing gas through the mixture until a sample of the oxygenated mixture, when heated to 100° C., attains a gel time in excess of 60 seconds.

The instant invention also comprises the compositions produced by the method of the invention.

DETAILED DESCRIPTION OF THE INVENTION

The monomers employed in accordance with the invention are esters of polyglycols with unsaturated polymerizable acids and can be any of the materials comprised in the generic formula given above. In general we have found those comprising at least one ether link in the molecule to be more satisfactory than those, such as ethylene glycol diacrylate, in which no ether group is present (where $y$ is 1). On the other hand, as the molecular weight of the glycol component increases (i.e. as the value of $y$ increases), the viscosity of the ester increases and the obtainable bond strength decreases. In consequence, and also for reasons of cost and ready availability, we found triethyleneglycol and tetraethyleneglycol derivatives to be the most suitable general purpose monomers.

The preferred monomers are derived from methacrylic acid. However, satisfactory monomers for the purposes of the invention can be those derived from acrylic acid, ethyl acrylic acid, chloroacrylic acid or mixtures thereof and the monomer can contain 2 or more of the acid residues. Thus, suitable monomers include exemplarily diethylene glycol diacrylate, diethylene glycol dimethacrylate, triethylene glycol dimethacrylate, tetraethylene glycol dimethacrylate, tetraethylene glycol diacrylate, dipropylene glycol dimethacrylate, diglycerol dimethacrylate, diglycerol tetramethacrylate, di(pentamethylene) glycol diacrylate, and 1,1,1-trimethylol propane triacrylate; the preferred monomers being triethylene glycol dimethacrylate and tetraethylene dimethacrylate.

When a tertiary amine is used as the nitrogen compound, this can be any convenient organic tertiary amine. The amine can be a trialkylamine wherein each alkyl can have from 1 to 4 carbon atoms and can have hydroxyl substitution. Thus, exemplarily, the amine can be trimethylamine, triethylamine, diethylpropyl amine, tripropylamine, triisopropylamine, tri - n - butylamine, triisobutylamine, tri-3-butylamine, benzyl dimethyl amine, triethanolamine, ethyldimethylamine, 2 - diethylaminoethanol and piperidine. There can also be used amines derived from aniline, such as dimethylaniline, diethylaniline, dimethyl-p-toluidine, dimethyl-o-toluidine, diethyl-p-toluidine and the like. In general, amines with a low degree of volatility and toxicity are preferred and dimethyl-p-toluidine is the preferred tertiary amine.

When the nitrogen compound is an imido compound, there can be used formamide, acetamide and their N-substituted derivatives such as N-methylformamide, N-ethylformamide, N-methylacetamide and N-ethylacetamide. There can also be used imides of dicarboxylic acids such as, exemplarily, succinimide and phthalimide. Among the imido compounds we particularly prefer the sulfimides and have found orthobenzoic sulfimide (saccharin) to be most effective.

In particular, we have found that it is advantageous to use both a tertiary amine and a sulfimide together in the composition being oxygenated, in that such combined use results in a greater reactivity under anaerobic conditions than when either tertiary amine or sulfimide is used alone. This advantage is obtained without any substantial impairment of the excellent storage stability which is characteristic of the compositions of this invention. This finding is in strong contrast to the disclosure in U.S. Pat. 3,046,262, column 3, line 60 and column 4, line 14 which teaches that amines should be excluded from sulfimide formulations if shelf stability is desired, pointing out that addition of amine accelerators to sulfimides in formulations with unoxygenated monomers provides no significant advantage in terms of activity and greatly reduces shelf-life. In the oxygenating method of the instant invention, we thus particularly prefer to use in conjunction both a tertiary amine and an imido compound. The combined use of dimethyl-p-toluidine and orthobenzoic sulfimide is preferred.

As to proportions, at least 0.05 part and no more than about 0.5 part by weight of the tertiary amine is necessary to stabilize 100 parts of monomer and we prefer to employ about 0.1–0.4 part. In the case of the imido compound, at least 0.1 part by weight and no more than 3 parts is necessary to stabilize 100 parts of monomer and we prefer to employ 0.5 to 1 part. Where, as in the preferred embodiments, the composition contains both tertiary amine and a compound containing the —CO—NH— group, it will generally be sufficient if their combined weights total at least 0.1 part for every 100 parts of monomer. On the other hand, it is generally unnecessary and undesirable to employ more than 15 parts of either component or more than 20 parts in total when both are used. In many cases the proportions compatible with or soluble in the particular monomer used will be lower than these upper limits and it will be obvious to those skilled in the art to limit the relative proportions so that separation or precipitation will not occur during storage. Specific proportions are illustrated in the examples hereinafter set forth.

An essential requirement in obtaining the excellent storage stability which is characteristic of the products of the instant invention is that the mixture of monomer and nitrogen compound must contain an effective level of conventional polymerization inhibitor. The chemical nature of such inhibitor is not critical and, in general, the proportion of such inhibitor which is commonly present in the acrylic monomers of commerce is sufficient. Thus, a level of about 10–200 parts per million based on the weight of monomer is usually adequate, but if desired, an additional 10–200 parts can be added.

Any of the known inhibitors of free-radical polymerization can be used, including hydroquinones, quinones and sterically hindered phenols. Of the various quinones, the benzoquinones have proven highly effective and most desirable for general use since they are readily admixed with the sealant compositions and exhibit excellent inhibition. Naphthoquinones have also proven quite effective and are desirable because they are relatively soluble in alcoholic solution. Phenanthraquinones and anthraquinones are least desirable because of problems of dissolving them and adding them to the mixture. As specific examples of two benzoquinones which have proven particularly effective are 1,4-benzoquinone and 2,5-dihydroxy benzoquinone. Other quinones which may be utilized are 2,5-diphenyl-p-benzoquinone, 1,2 - naphthoquinone and 9,10-anthraquinone. Exemplarily, the inhibitor can be hydroquinone, methyl hydroquinone, p-t-butylcatechol, di-t-butylhydroquinone, 2,4-dinitrochlorobenzene or phenolthiazine. Hydroquinone is preferred.

Although not essential, the performance of the compositions under anaerobic conditions may be further enhanced by the incorporation of between 0.1 and 20 parts, for every 100 parts by weight of the monomer, of a polymerization initiator selected from organic hydroperoxides and a restricted range or organic peroxides. Exemplary of the former group are cumene hydroperoxide, tertiary butyl hydroperoxide, methylethyl ketone hydroperoxide, ethylene glycol dimethyl ether hydroperoxide, and other hydroperoxides derived from hydrocarbons, ketones, ethers and esters, such as hydroperoxides formed by oxygenation in the liquid phase of the following compounds: methyl butene, cetane, cyclohexene, ethylether, ethylene glycol diethyl ether, diethylene glycol dimethyl ether, tetraethylene glycol dimethyl ether, diethylene glycol, polypropylene glycol, ortho formate, trimethyl ortho formate, acetal, tetraethoxy propane, dioxane, paraldehyde, acetyl acetone, methyl n-hexyl ketone, methyl n-amyl ketone, isopropyl ketone, tetralin and tetra hydrocarbazol.

The restricted range of organic peroxides which may be employed to enhance performance embraces peroxides with a half-life greater than 5 hours at 100° C., the half-life being defined as the time required to reduce by 50 percent the active oxygen content of a .5 mole percent solution of the peroxide in benzene at the specified temperature. Such peroxides include, for example, 2,5-dimethyl-2,5-di(tertiarybutylperoxy) hexane, ditertiary butyl peroxide, dihexylene glycol peroxide, tertiary butyl cumylperoxide and methyl-isobutylketone peroxide.

More reactive peroxides, such as benzoyl peroxide, generally impair the shelf life of the compositions if incorporated in more than trace amounts.

Oxygenation of the compositions can be carried out by bubbling an oxygen-bearing gas through the mixture of monomer and nitrogen compound at normal or slightly elevated temperatures. The oxygen-bearing gas can be pure oxygen or ozone, or can comprise an inert gas. Air is adequate, however, and is preferred for reasons of convenience and low cost.

The rate of oxygenation is affected by temperature, being more rapid at elevated temperature than at room temperature. We prefer, however, to conduct the oxygenation at room temperature or at only slightly elevated temperatures, say at 20–30° C., so that the course of the reaction can be more readily controlled.

The mechanism of oxygenation in the respective presence and absence of nitrogen compounds is incompletely understood. In the earlier disclosure preparing oxygenated anaerobic monomers (U.S. 2,628,178, column 6, line 33) an analytical procedure was described using a titration with sodium thiosulfate reagent. In that disclosure it was found that an active oxygen content as thus measured was preferably about 0.1–1.5% on weight of monomer. In contrast to this, we have found that a similar determination of the active oxygen content of the oxygenated compositions of this invention does not provide a satisfactory method of predicting stability.

We prefer to follow the course of the oxygenation process by determining the gelation time at elevated temperature, conveniently at 100° C., of samples removed at intervals as oxygenation proceeds. We have found that compositions having a gelation time at 100° C. in excess of 60 seconds, and preferably in excess of 100 seconds, will have adequate stability at room temperature. It will be obvious to those skilled in the art to establish a quantitative relationship between the gelation time at an elevated temperature and the shelf-life at room temperature for a given composition so as to insure that the amount of oxygenation in subsequent batches is adequate to achieve the requisite shelf-life by protracting the oxygenation process until the corresponding gelation time is attained.

The time required to achieve an adequate amount of oxygenation can vary considerably depending on factors which include the temperature of oxygenation, the nature of the monomer, the type and level of polymerization and inhibitor present and the composition and proportion of nitrogen compounds used. In general, however, we have found that oxygenation proceeds much more rapidly in the presence of a nitrogen compound in accordance with this invention than when the monomer is oxygenated alone or in the presence of a peroxide as taught by U.S. 2,628,178. Thus, oxygenation from 2 to 3 days at 30° C. will generally be sufficient to insure reaching the desired gelation time as above described and thus to insure stability.

It is unnecessary to prolong oxygenation substantially beyond the point at which satisfactory stability is obtained. In some cases prolonged oxygenation may even be undesirable for the reason that "over oxygenation" can cause a decrease in stability.

When a tertiary amine and a sulfimide are both used in the preparation of a product of this invention, it is preferred to add these in two separate and successive stages, first carrying out an oxygenation to the aforementioned gel-time level in the presence of one of the additives, then adding the second additive to this oxygenated mixture and resuming the oxygenation till the desired gel-time is again reached. Thus, when dimethyl-p-toluidine and saccharin are used, either the dimethyl-p-toluidine or the saccharin (preferably the saccharin) is first added to the unoxygenated monomer and this mixture is oxygenated, then the second additive is added to the oxygenated mixture and oxygenation is resumed. By this procedure, we avoid premature polymerization which can take place in an insufficiently oxygenated system. A similar procedure can likewise be followed with advantage when a peroxide or hydroperoxide is added to the composition. However, it is generally not necessary to resume oxygenation after the addition of any further inert minor ingredients such as dyestuffs, plasticizers and the like.

The form in which compositions of this invention can be used will depend on the nature of the particular application. For many purposes, there is no need of further modification. Thus, for example, in the locking of nuts to bolts, a fluid nonviscous composition is usually most desirable, enabling a free-flow into and around the threads without impeding the spinning of the nut on the bolt shaft prior to tightening. In other cases, as when a gas-tight seal is required, it may be desirable to use a more viscous composition. For such purposes, the viscosity can conveniently be increased by incorporating thickening agents such as polystyrene, polymethacrylate, polybutylmethacrylate, polyester resin and the like. There can also be added inert filling materials such as finely divided silica, montmorillonite clay, bentonite, and the like. In particular, the use of micronized silica results in paste-like thixotropic compositions.

The compositions of this invention can also be modified by the addition of suitable pigments or dyestuffs. Thus, it is sometimes desirable to increase the visibility of the normally colorless or very pale compositions so that treated surfaces can be readily distinguished from untreated surfaces. In general, we have found dyestuffs of the anthraquinone series, such as 1:4-di-mono-methyl-amino-anthraquinone, 1:4-di-mono-isopropylamino-anthraquinone and 1:4-di-monoethyl amino anthraquinone to be satisfactory for this purpose. Dyestuffs containing unsubstituted —OH groups or unsubstituted amine groups are in general to be avoided, since they exert a marked inhibiting influence on the polymerization of the compositions.

The anaerobic polymerization of the compositions of this invention is accelerated by the surface of certain metals including iron, mild steel, cadmium, cobalt and manganese. Certain other metals, including aluminum, zinc and copper, have a lower catalytic activity. Non-metallic surfaces such as glass do not catalyze polymerization. In bonding surfaces of low catalytic activity, it can be advantageous to use a primer such as a derivative of a catalytic metal such as ferric chloride, cobalt naphthanate, manganese resinate and the like.

It will be obvious that traces of grease, lacquers and the like, as well as electro-plated coatings of non-catalytic metals on the surfaces of otherwise catalytic metals may retard polymerization, or decrease the bond strength obtainable. Where bonds of maximum strength are required, we therefore prefer to remove traces of grease or lacquer, conveniently by suitable solvent treatment, and, in the case of metal plated surfaces, to employ a primer such as those mentioned above.

The compositions of this invention can also incorporate, as accelerators of polymerization, organic acids, preferably organic monocarboxylic acids such as benzoic acid, paratoluic acid or naphthyl acetic acid, or their corresponding anhydrides. Anhydrides of dibasic aromatic acids, such as phthalic or terephthalic acid can also be used. Aliphatic acids are, in general, less satisfactory accelerators for the compositions of the invention where the latter are employed on many non-ferrous metal surfaces. They have, however, some utility where the compositions are employed on ferrous metals and may conveniently be employed in conjunction with aromatic acids for bonding nonferrous surfaces.

The compositions of this invention are particularly suitable for use as locking compounds for cementing nuts to threaded shafts, bushes to bush housings and the like. In many cases they can be applied either before or after assembly of the components. For applying after assembly, an unthickened composition which is sufficiently fluid to penetrate between the components is preferred. If the compositions are applied to components prior to assembly, the unassembled coated components can be stored in air for considerable periods up to several months since the contact with atmospheric oxygen is sufficient to inhibit polymerization even when the coated surface is anaerobically catalytic such as iron. When such previously coated components are assembled so as to exclude air, however, polymerization will commence and a considerable bond strength will normally develop within a few hours, even at room temperature.

This invention will be further illustrated by description in connection with the following specific examples of the practice of it wherein, as also elsewhere herein, proportions are in parts by weight unless stated otherwise.

Example I

A glass flask fitted with a non-metallic stirrer and connected to a supply of compressed air was charged with 490 grams of triethylene glycol dimethacrylate known to contain 0.006% by weight of hydroquinone as an inhibitor of polymerization and 10 grams of O-benzoic sulfimide. This mixture was stirred at 30° C. for 4 days while a continuous stream of air was bubbled through it. At the end of this period the gelation time at 100° C. was greater than 300 seconds and the resultant oxygenated product was discharged. A sample stored at room temperature in an opaque polyethylene bottle, which was tightly stoppered but retained a small air space above the level of the liquid, was still usable after 9 months.

A further sample was tested by coating onto 5/16 inch BSF mild steel bolts, running a corresponding nut onto the shank of each without sealing it and allowing the assemblies to stand at room temperature (25° C.). After 24 hours the force required to initiate rotation of the nut was measured using a torque spanner and found to be 3.4 Nm. When a similar test was made on corresponding material which had been stored for 9 motnhs, the torque was 3 Nm.

Example II

To a composition prepared as in Example I, 5 grams of 2,5-dimethyl-2,5-di(tertiary butyl peroxy) hexane was added and the mixture was agitated and aerated for an additional day at 30° C. The gelation time of a sample was again found to be in excess of 300 seconds at 100° C.

This product gave a break-out torque of 11.0 Nm. after 24 hours at 25° C. on 5/16 inch BSF bright mild street nuts and bolts. After storage in an opaque polyethylene bottle for more than 9 months at room temperature, the break out torque in a similar test was 10.4 Nm.

Example III

A mixture of 497.5 grams of triethyleneglycol dimethacrylate containing inhibitor as stated in Example I and 2.5 grams of N,N-dimethyl-p-toluidine was stirred and aerated under the conditions described in Example I for 4 days until a gelation time of greater than 300 seconds at 100° C. was obtained. The resultant product was stable for more than 8 months at room temperature and, under conditions similar to those in Example I, gave a break-out torque of 9.1 Nm. after 24 hours at 25° C.

Example IV 5 grams of 2,5-dimethyl-2,5-di(tertiary butyl peroxy) hexane was added to the product of Example II and the mixture was then stirred and aerated for an additional day at 30° C., when a gelation time in excess of 300 seconds at 100° C. was obtained. This product was likewise stable for more than 8 months at room temperature and gave a break-out torque of 5 Nm. after 24 hours at 25° C.

Example V 4 grams of o-benzoic sulphimide were added to 396 grams of tetraethyleneglycol dimethacrylate inhibited (as above) in a non-metallic apparatus equipped for stirring and aeration. When the sulphimide had dissolved 0.3 grams of N,N-dimethyl-p-tolidine was added and stirring and oxygenation were continued until a gelation time of more than 300 seconds at 100° C. had been achieved (2 days). Aeration was then discontinued.

The resultant product was stable for more than 9 months at room temperature and produced a break-out torque of 12 Nm. in 3 hours at 25° C. when tested as in Example I.

Example VI

A composition was prepared as in Example 5 except that 5 grams of 2,5-dimethyl-2,5-di(tertiary butyl peroxy) hexane was added when the gelation time after the second addition of amine had reached in excess of 60 seconds. Aeration was then continued until a gelation time of 300 seconds at 100° C. was obtained.

The product was stable for more than 9 months at room temperature and gave an unwinding torque of 11 Nm. after 3 hours at 25° C.

For the purposes of comparison only as illustrative of the unsatisfactory products produced when oxygenation is not carried out, the compositions of Examples V and VI were prepared by mixing the ingredients without oxygenation. In both cases the compositions gelled on standing overnight at room temperature even though they were stored in opaque polyethylene bottles in the presence of air.

Example VII

A composition was prepared as in Example VI except that the tetraethyleneglycol dimethacrylate was replaced by triethylene glycol dimethacrylate inhibited by 0.006% by weight of hydroquinone and 10 grams of cumene hydroperoxide was substituted for the 5 grams of peroxide.

This composition was also storage-stable and gave an unwinding torque of 10 Nm. after 3 hours at 25° C. on 5/16 inch BSF bright mild steel nuts and bolts.

Example VIII

A solution of 4 grams of N,N-dimethyl-p-toluidine in 180.4 grams of inhibited tetraethylene glycol dimethacrylate was stirred and aerated for 1 day at 25° C. 5 grams of benzoic acid were then added and stirred until dissolved. 10 grams of 2,5-dimethyl-2,5-di(tertiary butyl peroxy) hexane were then charged and stirring and aeration of the mix continued until a gelation time in excess of 300 seconds was obtained.

This product, which was still satisfactory after storage in partially-filled polyethylene bottles for 7 months at room temperature, gave an unwinding torque of 14 Nm. when tested as in Example I.

Example IX

A Formulation A exemplifying the instant invention was prepared in the following manner:

Saccharin (10 g., 1%) was added to triethyleneglycol dimethacrylate (787 g., 78.7%) in a liter flask fitted with a non-metallic stirrer and air inlet. The solution was stirred and aerated until the saccharin had all dissolved. An aliquot of N,N-dimethyl-p-toluidine (1.5 g., .15%) was added, after 3 hours the gel time was 60 seconds at 100° C. The solution was stirred for a further 15 hours when the gel time was then greater than 300 seconds at 100° C. A further aliquot of N,N-dimethyl-p-toluidine (1.5 g., .15%) was then added, reducing the gel time to 60 seconds. Stirring and aeration was then continued. After 20 hours the gel time was greater than 300 seconds. A portion (one third) of cumene hydroperoxide (7 g., 0.7%) was added. After stirring and aerating for 3 hours a gel time (at 100° C.) of 180 seconds was obtained, the remainder of the cumene hydroperoxide (13 g.) was added. The solution was left stirring and aerating overnight for 20 hours when a gel time (at 100° C.) of 220 seconds was obtained. Then diisodecyl phthalate (50 g., 5%), methacrylic acid (30 g., 3%) and Gelva V.100 (100 g. a polyvinyl acetate of m.w. 5,000,000 obtainable commercially from Shawinigen Resins) was added. After stirring and aerating for 20 hours, a gel time of 240 seconds at 100° C. was obtained. The mixture was therefore left stirring and aerating for a further 24 hours when a gel time of greater than 300 seconds/100° C. was obtained. This product was stable for more than 15 months at room temperature when stored in polythene bottles.

A Formulation B illustrating a non-oxidized procedure and not prepared with the benefits of the instant invention was prepared as follows:

Saccharin (10 g.) was added to triethyleneglycol dimethacrylate (809.85 g.) in a liter flask fitted with a non-metallic stirrer. The solution was stirred until all the saccharin had dissolved. The methacrylic acid (30 g.), diisodecyl phthalate (50 g.) and Gelva V.100 (100 g.) were then added. When the ingredients had all dissolved, the mixture had a gel time of only 50 seconds at 100° C. Therefore, hydroquinone (.15 g., 160 p.p.m.) was added. After stirring 3 hours the solution had a gel time of 180 seconds at 100° C.

Comparative tests made with Formulations A and B, summarized in the accompanying table, show advantages of the oxidized product of the instant invention over the non-oxidized product of the prior art.

| Material | Mean torque on 1/16 BSF nuts and bolts after 3 hrs. at 25° C. | | |
|---|---|---|---|
| | Bright mild steel, Nm. | Cadmium plated, Nm. | Stainless steel, Nm. |
| Formulation: | | | |
| A | 13 | 12 | 9 |
| B | 5 | (1) | (1) |

1 Not set.

A significant advantage was observed also in a test wherein adhesive was placed between two cadmium blocks (99.999% cadmium) in the form of a cross. Curing time was only 10 minutes when Formulation A was used whereas the Formulation B was not set after 1/2 hour.

It will be understood that it is intended to cover changes and modifications of the examples of the invention herein chosen for the purpose of illustration which do not constitute departures from the spirit and scope of the invention.

What is claimed is:

1. A method for preparing a storage-stable adhesive capable of curing in the absence of air, which method comprises
   (i) mixing
      (a) a monomer corresponding to the general formula

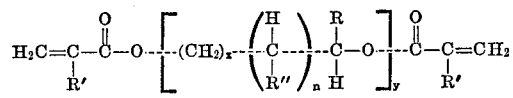

(wherein R is —H, —CH$_3$, —C$_2$H$_5$, —CH$_2$OH or —CH$_2$OCOCR'=CH$_2$, R' is —H, —Cl, —CH$_3$ or —C$_2$H$_5$, R" is —H, —OH, or

—OCOCR=CH$_2$, x and y are integers each equal to at least 1 and n is 0 or 1), containing 10–200 parts per million based on weight of monomer of an inhibitor for olefinic polymerization, with
      (b) a minor proportion of a nitrogen compound selected from the group consisting of organic tertiary amines and imido compounds having the imido group

and
   (ii) passing a stream of oxygen-bearing gas through the mixture until a sample of the oxygenated mixture, when heated to 100° C. attains a gel time in excess of 60 seconds.

2. The method of claim 1 wherein the monomer is triethyleneglycol or tetraethyleneglycol dimethacrylate and wherein the nitrogen compound is N,N - dimethyl - p-toluidene and/or o-benzoic sulfimide.

3. The method of claim 1 wherein the weight of nitrogen compound used corresponds to 0.1–15% of the weight of monomer.

4. A method for preparing a storage-stable adhesive capable of curing in the absence of air, which method comprises
   (i) mixing 100 parts by weight of a monomer selected from triethyleneglycol dimethacrylate and tetraethyleneglycol dimethacrylate with 0.0010–0.0200 part by weight of hydroquinone and 0.1–3 parts by weight of o-benzoic sulfimide,
   (ii) passing a stream of oxygen-bearing gas through the mixture until a sample of the oxygenated mixture, when heated to 100° C., has a gel-time in excess of 60 seconds,
   (iii) adding to the thus-oxygenated mixture 0.05–0.5 part by weight of N,N-dimethyl-p-toluidine, and
   (iv) passing a stream of oxygen-bearing gas through the mixture until a sample of the oxygenated mixture, when heated to 100° C., again has a gel-time in excess of 60 seconds.

5. A storage-stable adhesive composition capable of curing in the absence of air, made by the method of claim 1.

6. A storage-stable adhesive composition capable of curing in the absence of air, made by the method of claim 2.

7. A storage-stable adhesive composition capable of curing in the absence of air, made by the method of claim 3.

8. A storage-stable adhesive composition capable of curing in the absence of air, made by the method of claim 4.

References Cited

UNITED STATES PATENTS

| | | | |
|---|---|---|---|
| 3,043,820 | 7/1962 | Krieble | 260—89.5 R |
| 3,046,262 | 7/1962 | Krieble | 260—89.5 R |
| 3,203,941 | 8/1965 | Krieble | 260—89.5 R |

HARRY WONG, Jr. Primary Examiner

U.S. Cl. X.R.

117—128.4, 161; 260—41 A, 41 C, 885